US008515501B2

(12) United States Patent
Lee et al.

(10) Patent No.: US 8,515,501 B2
(45) Date of Patent: Aug. 20, 2013

(54) PORTABLE COMMUNICATION DEVICE HAVING A TOUCH-SCREEN LOCKING UNIT (75) Inventors: Min-Sung Lee, Gyeonggi-do (KR); Seung-Woo Lim, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 556 days.

(21) Appl. No.: 12/556,810

(22) Filed: Sep. 10, 2009

(65) Prior Publication Data
US 2010/0081479 A1 Apr. 1, 2010

(30) Foreign Application Priority Data
Sep. 30, 2008 (KR) ........................ 10-2008-0096115

(51) Int. Cl.
*H04M 1/00* (2006.01)
*H04B 1/38* (2006.01)

(52) U.S. Cl.
USPC ........ 455/575.1; 455/90.3; 455/566; 345/179

(58) Field of Classification Search
USPC ..................... 455/566, 575.1, 90.3; 345/173, 345/179
See application file for complete search history.

(56) References Cited

U.S. PATENT DOCUMENTS

| | | | | |
|---|---|---|---|---|
| 5,973,677 A * | 10/1999 | Gibbons | ........................ | 345/179 |
| 6,344,848 B1 * | 2/2002 | Rowe et al. | ................... | 345/179 |
| 6,518,957 B1 * | 2/2003 | Lehtinen et al. | .............. | 345/173 |
| 7,046,237 B1 * | 5/2006 | Nicolas et al. | ................. | 345/179 |
| 7,053,883 B1 * | 5/2006 | Kwok et al. | ................... | 345/156 |
| 7,283,127 B2 * | 10/2007 | Taylor et al. | .................. | 345/173 |
| 7,961,150 B2 * | 6/2011 | Kyou et al. | ................... | 343/702 |
| 7,994,913 B2 * | 8/2011 | Lee | ........................... | 340/568.1 |
| 2004/0108997 A1 * | 6/2004 | Lee | ............................... | 345/179 |
| 2004/0212586 A1 * | 10/2004 | Denny, III | ..................... | 345/156 |
| 2005/0270277 A1 * | 12/2005 | Park | ............................... | 345/173 |
| 2006/0133015 A1 * | 6/2006 | Lin et al. | ........................ | 361/681 |
| 2006/0209012 A1 * | 9/2006 | Hagood | ........................ | 345/109 |
| 2007/0103455 A1 * | 5/2007 | Omata et al. | .................. | 345/179 |
| 2007/0236468 A1 * | 10/2007 | Tuli | ................................ | 345/173 |
| 2008/0036747 A1 * | 2/2008 | Hope | ............................ | 345/179 |
| 2009/0128523 A1 * | 5/2009 | Sheynkman et al. | .......... | 345/179 |

* cited by examiner

*Primary Examiner* — Simon Nguyen
(74) *Attorney, Agent, or Firm* — Cha & Reiter, LLC.

(57) ABSTRACT

A portable communication device having a touch-screen locking unit that can prevent operation of the touch screen due to an unwanted screen touch is disclosed. The device comprises a main body housing having a touch screen. A mount is formed in the main body housing. An input unit is attached to or detached from the mount. A locking unit is provided on the mount and turns on/off a locking state of the touch screen according to attachment/detachment of the input unit. The locking state of the touch screen can be automatically set to an ON/OFF state by attaching/detaching a stylus pen to/from a mounting groove. When the touch screen is carried or kept, a touch screen operation or change according to an external environment can be prevented.

19 Claims, 13 Drawing Sheets

PORTABLE COMMUNICATION DEVICE HAVING A TOUCH-SCREEN LOCKING UNIT

CLAIM OF PRIORITY

This application claims the benefit of the earlier filing date, under 35 U.S.C. §119(a), to that Korean Patent Application filed in the Korean Intellectual Property Office on Sep. 30, 2008 and assigned Serial No. 10-2008-0096115, the contents of which are incorporated herein by reference.

BACKGROUND OF THE INVENTION

1. Field of the Invention

The present invention relates to the field of portable communication devices and more particularly to a portable communication device having a touch-screen locking unit that can prevent operation of the touch screen due to an unwanted screen touch when the portable communication device having a touch screen is unused.

2. Description of the Related Art

Generally users may carry one or more portable electronic devices such as a portable communication device, a Moving Picture Experts Group (MPEG) layer 3 (MP3) player, and a portable multimedia player (PMP) to receive various contents. As is known many of these functions may be operated in a single portable device.

According to demands of consumers, portable electronic devices with multiple functions are being miniaturized. When mobile communication services through the portable electronic devices started to be commercialized only voice communication or short message transmission were used. However, with the high portability and widespread supply of portable terminals, various functions have been added to portable devices. For example, current portable devices may include functions such as an MP3 function, a digital camera function, a camcorder function, a television (TV) function, a video communication function, a wireless local area network (WLAN) function, a Bluetooth function, a fingerprint recognition function, a game machine function, a digital multimedia broadcasting (DMB) function, an electronic dictionary function, etc. Accordingly, the portable terminals are being used as "digital multimedia devices".

The portable communication devices as described above may be classified into a bar type terminal, a flip type terminal, a folder type terminal, and a slide type terminal according to its outward form. Input units of the portable terminals may be classified into a button type input unit and a touch type input unit for performing an input operation by a direct touch on a liquid crystal screen.

A portable communication device having a button type input unit is generally provided with a printed circuit board (PCB) on one face thereof and a keypad on an upper portion of the PCB, so that a user may input desired information by pressing the keypad. The use of the button type input unit has a problem in that the keypad fault easily occurs since buttons are frequently used and access to a computer or the portable device becomes difficult.

To solve the above-described problem, there has been proposed a touch-screen input unit using a touch screen to which desired information may be directly input by making contact with a liquid crystal screen. The touch screen is an input unit for inputting information when a user directly touches a display using his/her finger or a stylus pen. Through direct touches on a display, the touch screen may provide inputs for all functions and may input menu and function keys.

Figure 1:
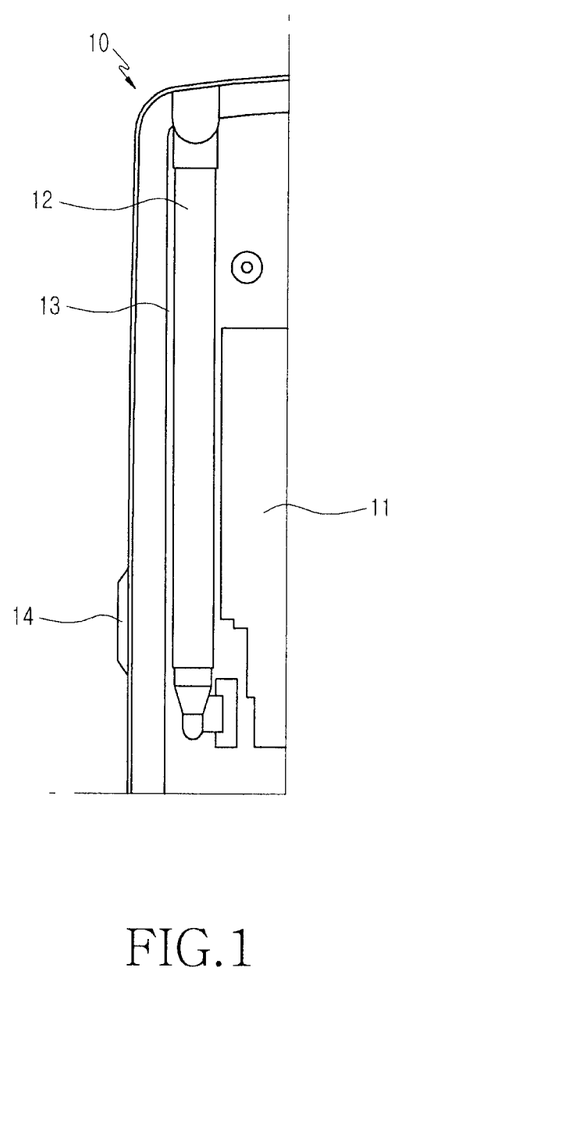
FIG. 1 illustrates a state in which a touch-screen locking unit is provided in a conventional portable communication device having a touch screen.
Figure 2:
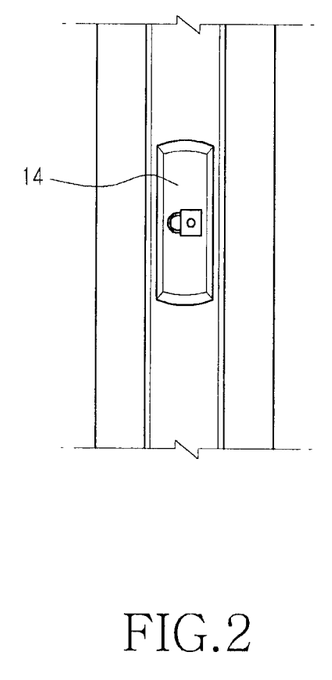
FIG. 2 illustrates a state in which a touch-screen locking unit is provided on a side of a conventional portable communication device having a touch screen.

FIG. 1 is a diagram illustrating part of a portable communication device having a touch screen and FIG. 2 is a diagram illustrating a state in which a touch-screen locking unit is provided on a side of a portable communication device having a touch screen. As illustrated in FIGS. 1 and 2, a large-sized display having a touch screen function (not illustrated) is provided on a main body housing 11 of a portable communication device 10. A stylus pen 12 for performing a function by making contact with the touch screen is provided on an inner side of the main body housing 11.

As illustrated in FIG. 1, the stylus pen 12 may be provided on a mounting groove 13 of the main body housing 11. Although not illustrated, the stylus pen 12 may be attached to or detached from a fixing loop provided on one side of the main body housing 11, like an accessory of the portable communication device 10. Since a space for mounting button keys to input information of numbers or characters is not required, the portable communication device 10 having the touch screen function may use a front surface of a wide housing as a display. Accordingly, the user may widely use the display in a DMB, game, or camera mode.

As illustrated in FIG. 2, a touch-screen locking unit 14 is provided to prevent an unwanted operation due to contact with the touch screen when a portable communication device not in use or to prevent a function or operation due to an unwanted contact with the touch screen while a user performs communication using the portable communication device 10. The locking unit 14 disposed on a side, top, bottom, front side, or backside of the terminal moves in a vertical or horizontal direction, thereby locking or unlocking the touch screen.

However, there is a problem in that the user must turn on/off the locking unit 14 at every use. Since the locking unit 14 is provided on an outer portion of the portable communication device 10, there is a problem in that the function or operation of the portable communication device 10 may be caused by an unwanted change from the OFF state to the ON state when the user carries the device 10, or the locking unit may be deformed or defective due to a frequent ON/OFF operation. When the locking unit 14 is provided on the outer portion of the portable communication device 10, the aesthetics of the portable communication device 10 may also be degraded.

Accordingly, a need exists for a portable communication device having a touch-screen locking unit, which can automatically turn on/off the locking unit of the portable communication device having a touch screen and prevent the malfunction of the portable communication device by preventing a change according to an external environment. Also, a need exists for a portable communication device having a touch-screen locking unit, which can automatically turn on/off a locking unit of a touch input unit according to mounting of a stylus pen in the portable communication device having a touch screen.

SUMMARY OF THE INVENTION

Accordingly, the present invention is to provide a portable communication device having a touch-screen locking unit that can automatically turn on/off a locking state of a touch screen by attaching/detaching a stylus pen.

In one aspect, the present invention is to provide a portable communication device having a touch-screen locking unit that can prevent a touch screen malfunction when a user keeps or carries the portable communication device by providing the touch-screen locking unit on an inner side thereof and that can improve the reliability of a touch screen.

According to an aspect of the present invention, there is provided a portable communication device having a touch-screen locking unit, including: a main body housing having a touch screen; a mount formed in the main body housing to/from which an input unit is attached/detached; and a locking unit provided on the mount and turning on/off a locking state of the touch screen according to attachment/detachment of the input unit.

BRIEF DESCRIPTION OF THE DRAWINGS

The above and other aspects, features and advantages of the present invention will become more apparent from the following detailed description when taken in conjunction with the accompanying drawings in which.

Throughout the drawings, the same drawing reference numerals will be understood to refer to the same elements, features and structures.

DETAILED DESCRIPTION OF THE INVENTION

Exemplary embodiments of the present invention will now be described in detail with reference to the annexed drawings.

Figure 3:
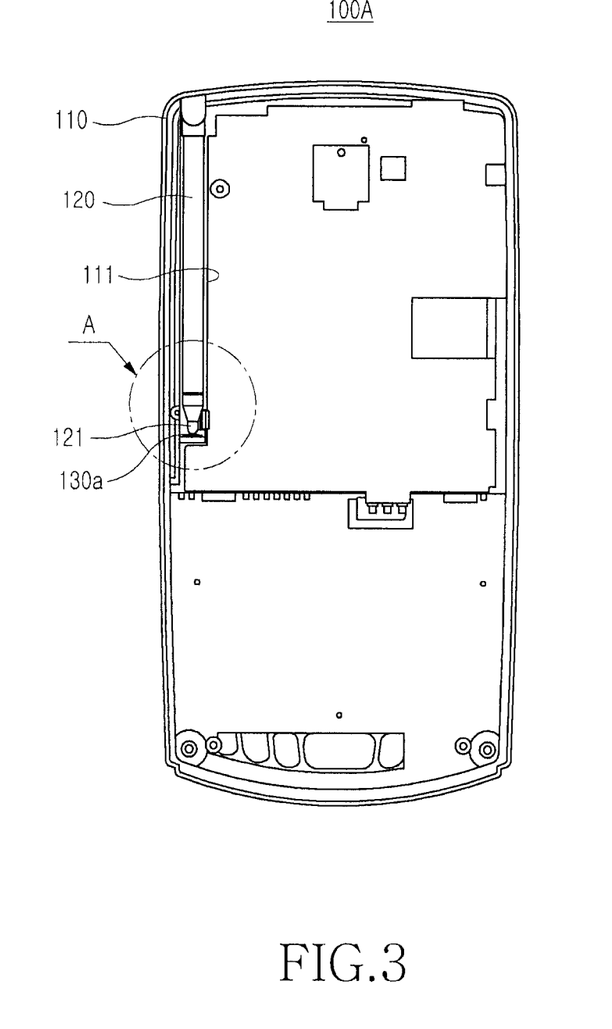
FIG. 3 illustrates a state in which a touch-screen locking unit is made of a dome key and a stylus pen is attached to a mounting groove in a portable communication device having the touch-screen locking unit according to an exemplary embodiment of the present invention.
Figure 4:
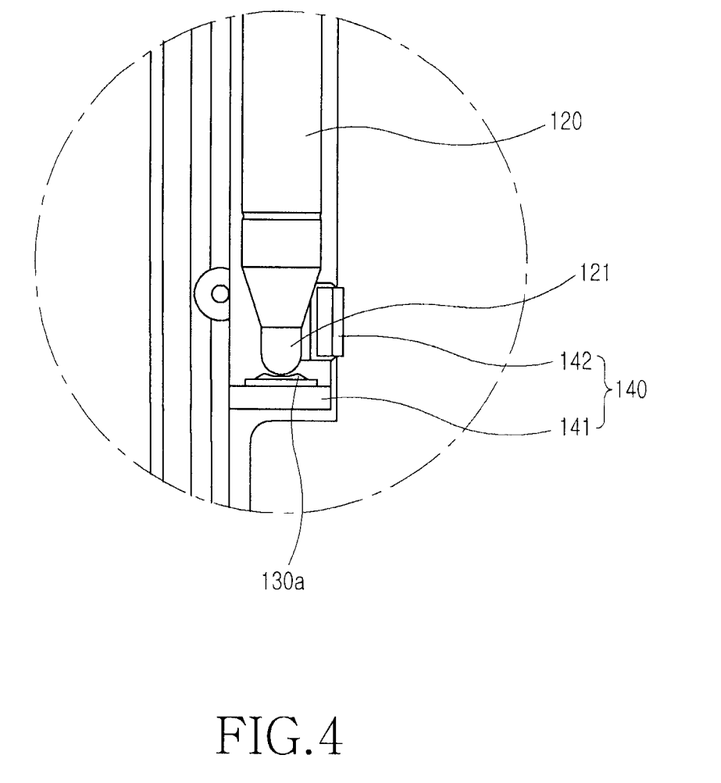
FIG. 4 is an enlarged diagram of section A shown in FIG. 3.
Figure 5:
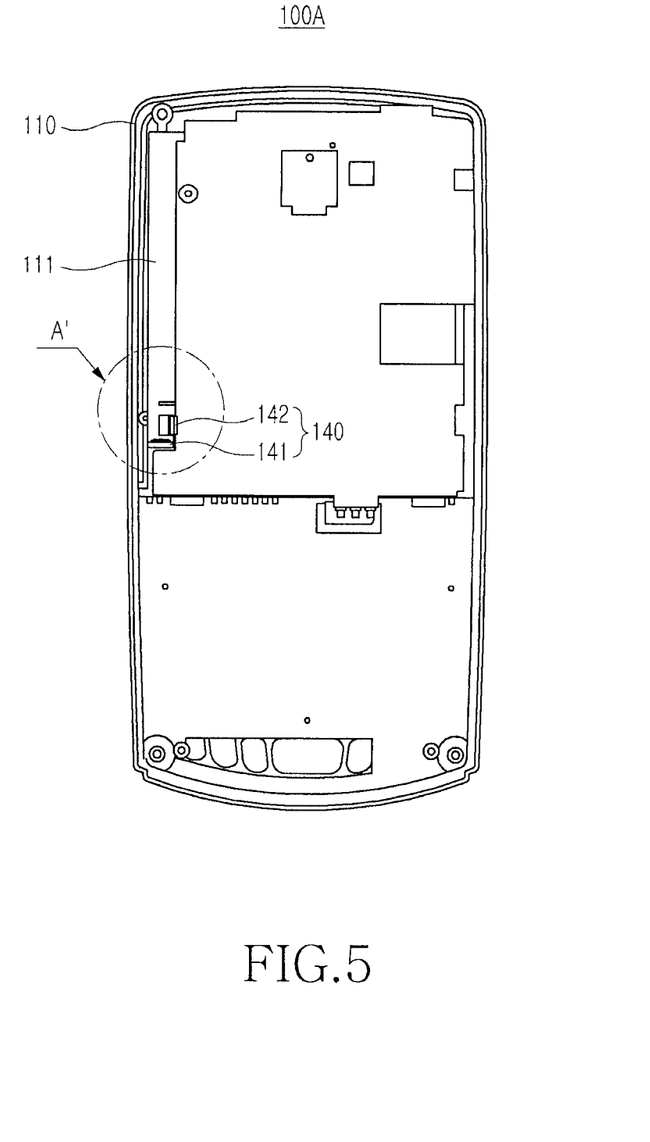
FIG. 5 illustrates a state in which a stylus pen is detached from the mounting groove in a portable communication device having a touch-screen locking unit according to an exemplary embodiment of the present invention.
Figure 6:
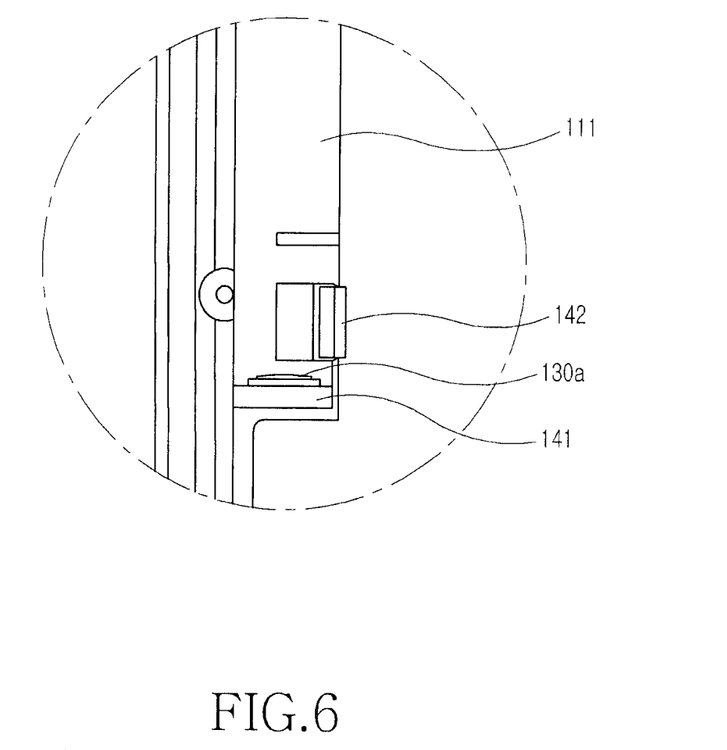
FIG. 6 is an enlarged diagram of section A' shown in FIG. 5.

As illustrated in FIGS. 3 to 13, portable communication devices 100A, 100B, 100C, 100D, and 100E having touch-screen locking units that include main body housings 110 having touch screens, mounts 111, and locking units 130a, 130b, 130c, 131d, 132d, and 130e, respectively. Each mount 111 is formed in the main body housing 110 and attached to or detached from an input unit 120 for inputting information by making contact with the touch screen. Each of the locking units 130a, 130b, 130c, 131d, 132d, and 130e, which is in contact with one end 121 of the input unit 120, is provided on the mount 111. When the input unit 120 is attached/detached, a locking state of the touch screen is set to an ON/OFF state, respectively. As illustrated in FIGS. 3 to 13, the mount 111 is made of a mounting groove in order to make it possible to attach/detach the input unit 120 to/from an inner side of the main body housing 110. The input unit 120 is made of a stylus pen to be attached to or detached from the mounting groove 111. As illustrated in FIGS. 3 to 6, the locking unit is represented as a dome key 130a. As illustrated in FIGS. 4 to 6, the mounting groove 111 has a support member 140 for supporting the dome key 130a and preventing the movement of the stylus pen 120. As illustrated in FIGS. 4 and 6, the support member 140 includes a first bracket 141 and a second bracket 142. The first bracket 141 for supporting the dome key 130a is provided at a lower end of the dome key 130a and the second bracket 142 for surrounding the stylus pen 120 and preventing the movement of the stylus pen 120 is provided on the mounting groove 111.

As illustrated in FIGS. 3 and 4, (embodiment 100A) when the stylus pen 120 is attached to the mounting groove 111, the stylus pen 120 is engaged with the second bracket 142 to prevent the movement of the stylus pen 120. The stylus pen 120 presses the dome key 130a to set the locking state of the touch screen to the ON state.

Figure 7:
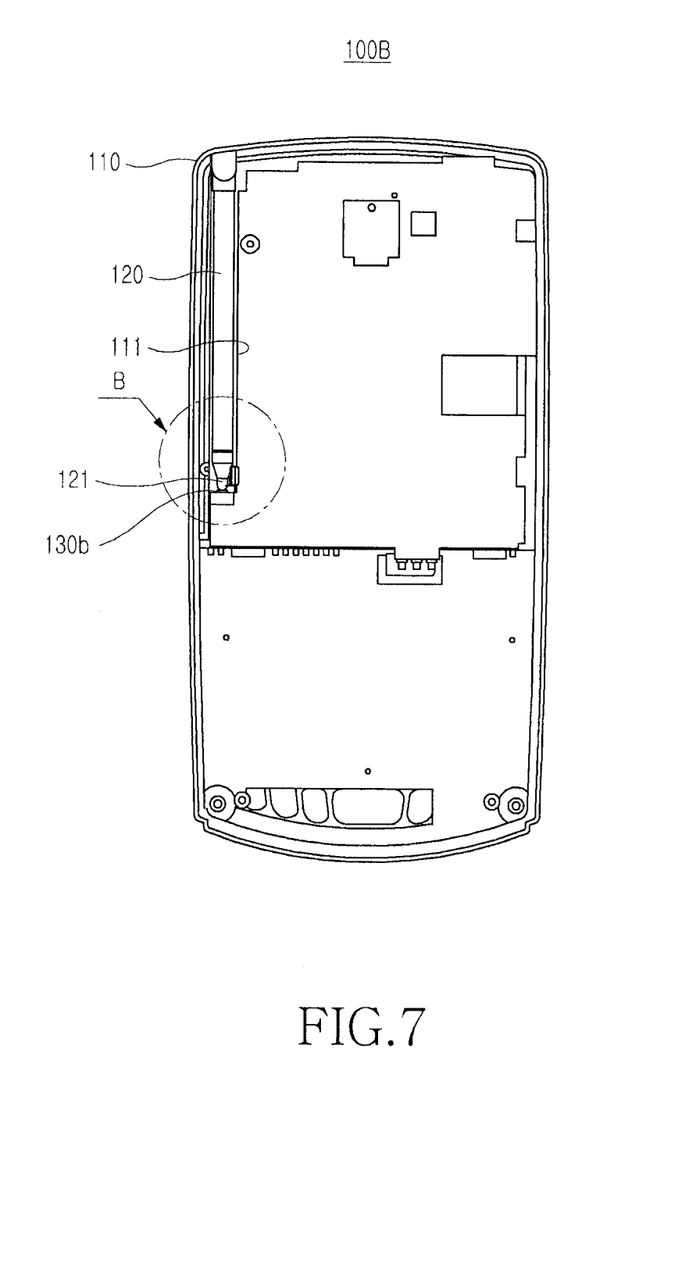
FIG. 7 illustrates an example in which a touch-screen locking unit is made of a button key in a portable communication device having the touch-screen locking unit according to an exemplary embodiment of the present invention.
Figure 8:
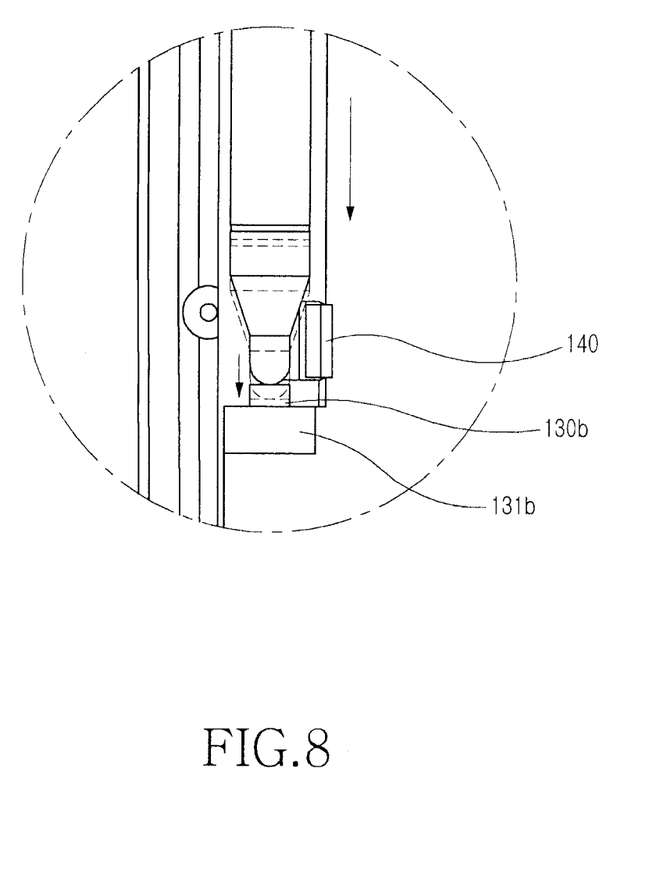
FIG. 8 is an enlarged diagram of section B shown in FIG. 7.

As illustrated in FIG. 5 and FIG. 6, when the stylus pen 120 is detached from the mounting groove 111, the dome key 130a is released and the locking state of the touch screen is set to the OFF state. As illustrated in FIGS. 7 and 8, the locking unit is made of a button key 130b. A PCB 131b is provided at a lower end of the button key 130b and is electrically connected to the button key 130b and a main PCB (not illustrated) of the touch screen.

As illustrated in FIGS. 7 and 8 (embodiment 100B), a support member 140 for supporting the button key 130b and preventing the movement of the stylus pen 120 is provided on the mounting groove 111. As illustrated in FIGS. 7 and 8, when the stylus pen 120 is attached to the mounting groove 111, the stylus pen 120 is engaged with the support member 140, so that the movement of the stylus pen 120 is prevented. The stylus pen 120 presses the button key 130b to set the locking state of the touch screen to the ON state. When the stylus pen 120 is detached from the mounting groove 111, the button key 130b pressed by the one end 121 of the stylus pen 120 is released and the locking state of the touch screen is set to the OFF state.

Figure 9:
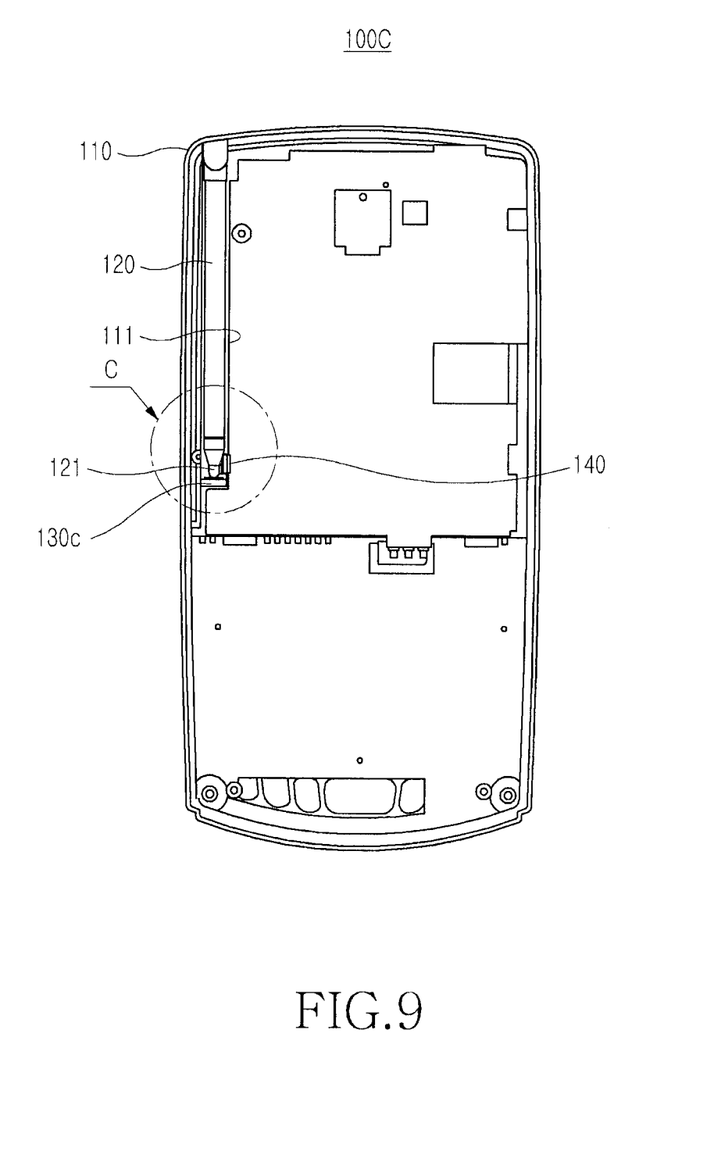
FIG. 9 illustrates an example in which a touch-screen locking unit is made of a touch key in a portable communication device having the touch-screen locking unit according to an exemplary embodiment of the present invention.
Figure 10:
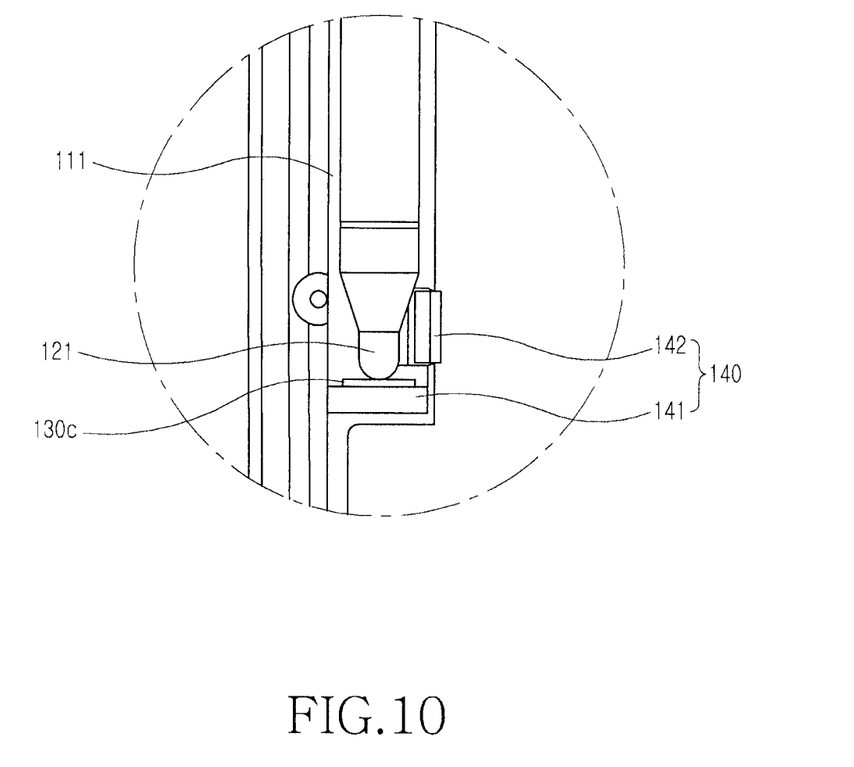
FIG. 10 is an enlarged diagram of section C shown in FIG. 9.

As illustrated in FIGS. 9 and 10 (embodiment 100C), the locking unit is made of a touch key 130c. When the one end 121 of the stylus pen 120 is in contact or non-contact with the touch key 130c, the locking state of the touch screen becomes the ON or OFF state, respectively. As illustrated in FIGS. 9 and 10, a support member 140 for supporting the touch key 130c and preventing the movement of the stylus pen 120 is provided on the mounting groove 111. As illustrated in FIGS. 9 and 10, the support member 140 includes first and second brackets 141 and 142. The first bracket 141 for supporting the touch key 130c is provided at a lower end of the touch key 130c. The second bracket 142 surrounds an outer periphery at one end of the stylus pen 120 and prevents the movement of the stylus pen 120. As illustrated in FIG. 9, when the stylus pen 120 is attached to the mounting groove 111, the stylus pen 120 is engaged with the second bracket 142 to prevent the movement of the stylus pen 120. The stylus pen 120 is in contact with the touch key 130c and the locking state of the touch screen is set to the ON state. When the stylus pen 120 is detached from the mounting groove 111, the touch key 130c is in non-contact with the stylus pen 120, thereby setting the locking state of the touch screen to the OFF state.

Figure 11:
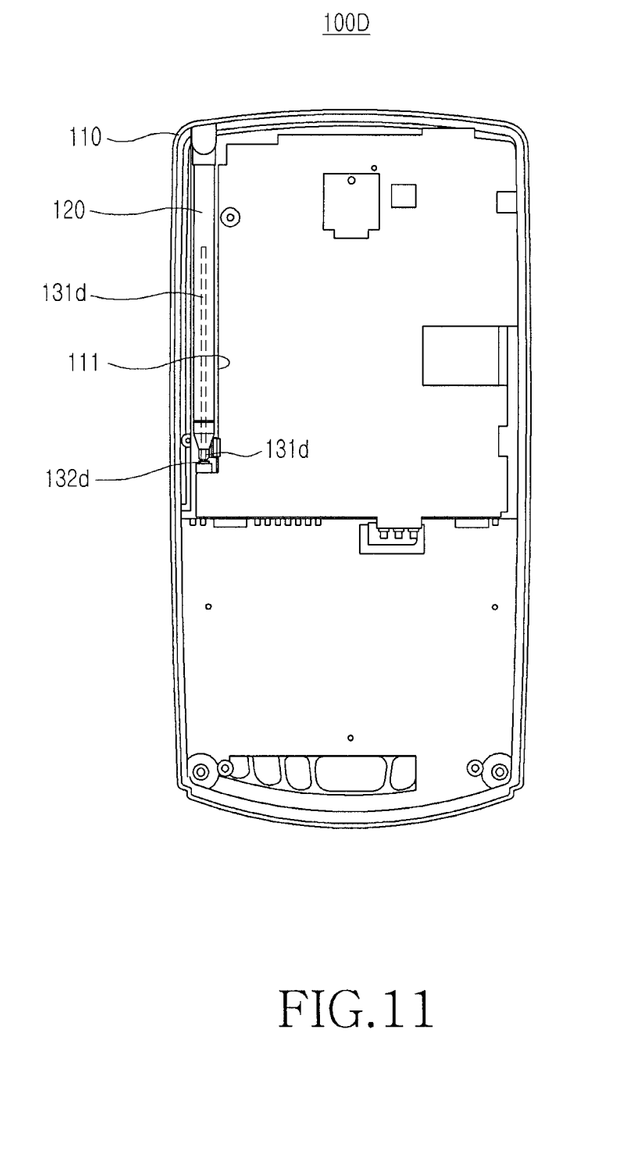
FIG. 11 illustrates an example in which a touch-screen locking unit is made of first and second magnets in a portable communication device having the touch-screen locking unit according to an exemplary embodiment of the present invention.

As illustrated in FIG. 11 (embodiment 100D), the locking unit includes a first magnetic member 131d and a second magnetic member 132d. The first magnetic member 131d is provided at one end 121 of the stylus pen 120. The second magnetic member 132d is provided at an end of the mounting groove 111 and is in contact or engaged with the first magnetic member 131d. The first magnetic member 131d is in contact or non-contact with the second magnetic member 132d, thereby setting the locking state of the touch screen to the ON or OFF state, respectively.

As illustrated in FIG. 11, when the stylus pen 120 is attached to the mounting groove 111, the first magnetic member 131d provided at the one end of the stylus pen 120 is in contact with the second magnetic member 132d provided on the mounting groove 111, thereby setting the locking state of the touch screen to the ON state. When the stylus pen 120 is detached from the mounting groove 111, the contact between the first magnetic member 131d and the second magnetic member 132d is released and the locking state of the touch screen is set to the OFF state, as described with regard to FIGS. 5 and 6.

Figure 12:
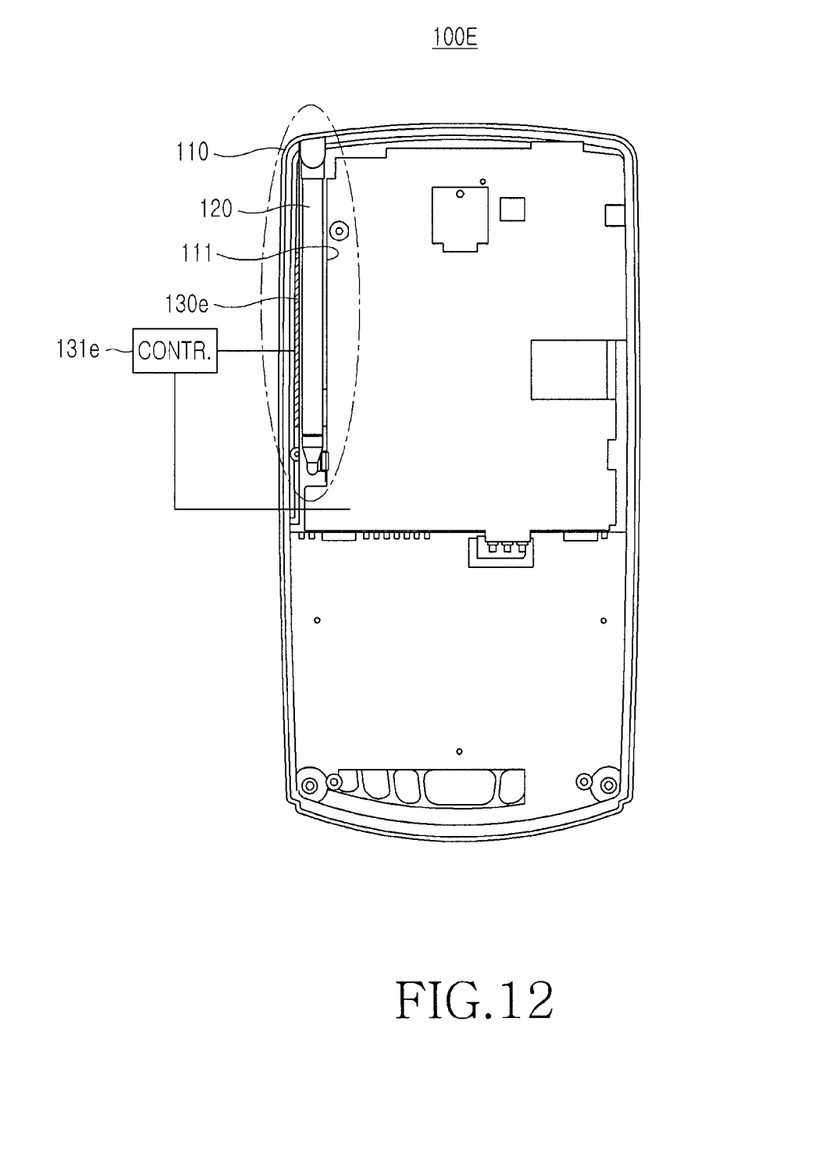
FIG. 12 illustrates an example in which a touch-screen locking unit is made of a sensor in a portable communication device having the touch-screen locking unit according to an exemplary embodiment of the present invention.
Figure 13:
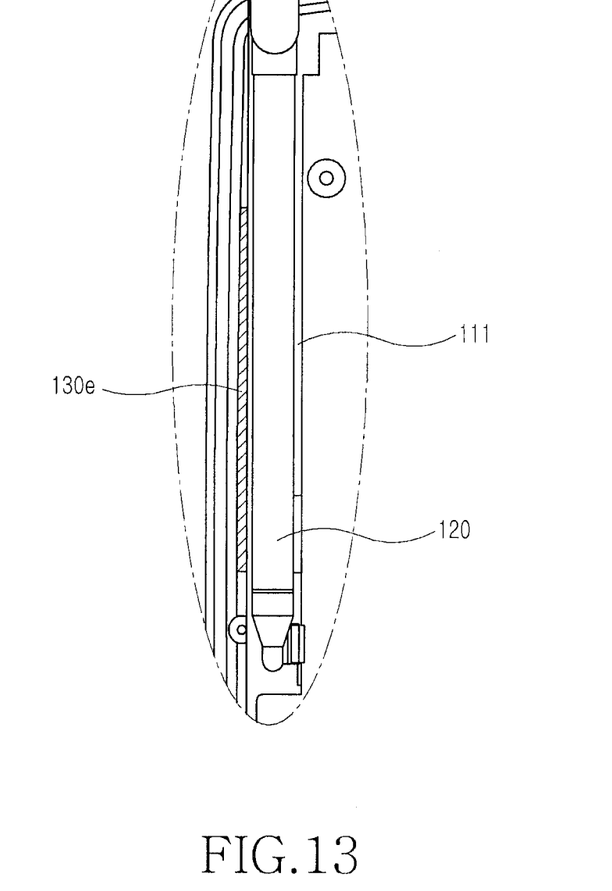
FIG. 13 is an enlarged diagram of section E shown in FIG. 12.

As illustrated in FIGS. 12 and 13 (embodiment 100E), the locking unit includes a sensor 130e and a controller 131e. The sensor 130e for sensing the attachment/detachment of the stylus pen 120 is provided on an inner periphery of the mounting groove 111. The controller 131e is provided to control a signal sensed by the sensor 130e when the stylus pen 120 is attached/detached. As illustrated in FIG. 12, when the stylus pen 120 is attached to the mounting groove 111, the sensor 130e senses the attachment of the stylus pen 120 and applies a sensed signal to the controller 131e, thereby setting the locking state of the touch screen to the ON state. When the stylus pen 120 is detached from the mounting groove 111, the sensor 130e senses the detachment of the stylus pen 120 and applies a sensed signal to the controller 131e, thereby setting the locking state of the touch screen to the OFF state.

The operations of the portable communication device having the touch-screen locking unit with the above-described structure according to exemplary embodiments of the present invention will be described in detail with reference to FIGS. 3 to 13.

The touch screen is provided in the main body housing 110 of the portable communication device. The stylus pen 120 for inputting information by making contact with the touch screen is provided on the mounting groove 111 formed in an inner side of the main body housing 110. The stylus pen 120 can be attached to or detached from the mounting groove 111. Each of the locking units 130a, 130b, 130d, and 130e is provided to set the locking state to the ON/OFF state according to the attachment/detachment of the stylus pen 120.

The locking unit can have a dome key 130a of a dome form as illustrated in FIGS. 3 to 6, a button key 130b of a button form as illustrated in FIGS. 7 and 8, a touch key 130c of a touch form as illustrated in FIGS. 9 and 10, a magnetic member 130d with the magnetism as illustrated in FIG. 11, or a sensor 130e as illustrated in FIGS. 12 and 13.

First, the operation of the portable communication device having the dome key 130a of the dome form as the touch-screen locking unit will be described with reference to FIGS. 3 to 6. The dome key 130a to be engaged with the one end 121 of the stylus pen 120 is provided at an end of the mounting groove 111. The first bracket 141 for supporting the dome key 130a is provided at the end of the mounting groove 111. The second bracket 142 for supporting the one end 121 of the stylus pen 120 and preventing the movement of the stylus pen 120 is provided on the inner periphery at the end of the mounting groove 111. The dome key 130a provided at an upper end of the first bracket 141 extends to the upper end and pressed and concaved by the one end 121 of the stylus pen 120. When the dome key 130a is pressed or released by the one end 121 of the stylus pen 120, the locking state of the touch screen becomes the ON or OFF state, respectively. When the stylus pen 120 is attached to the mounting groove 111, the outer periphery of the stylus pen 120 is engaged with the second bracket 142 and the one end 121 of the stylus pen 120 presses the protruded dome key 130a. Although not illustrated, the dome key 130a is electrically connected to a main PCB of the touch screen. Accordingly, the locking state of the touch screen can be switched to an ON/OFF state according to the press of the dome key 130a. When the stylus pen 120 presses the dome key 130a, the locking state of the touch screen is continuously maintained as the ON state. Since the touch screen is locked even when the touch screen makes contact with an external environment, a touch screen function or operation can be prevented and the locking state can be stably maintained. In this state, when the stylus pen 120 is detached from the mounting groove 111, the dome key 130a pressed by the stylus pen 120 is released. The dome key 130a is again extended and the locking state of the touch screen is changed to an OFF state. Accordingly, a character, call, or menu can be executed when the stylus pen makes contact with the touch screen. Information can be input when the stylus pen 120 makes contact with the touch screen.

The operation of the portable communication device having the button key 130b of the button form as the touch-screen locking unit will be described with reference to FIGS. 7 and 8. The button key 130b to be engaged with the one end 121 of the stylus pen 120 is provided at an end of the mounting groove 111. At the end of the mounting groove 111, the PCB 131b electrically connected to the main PCB of the main body housing 110 is provided to detect a press state of the button key 130b and switch the locking state of the touch screen according to the press state of the button key 130b. To prevent the movement of the stylus pen 120 when the inner periphery at the end of the mounting groove 111 is engaged with an outer periphery at the one end 121 of the stylus pen 120, the support member 140 is provided at the end of the mounting groove 111. When the stylus pen 120 is attached to the mounting groove 111, the stylus pen 120 is engaged with the support member 140 and the one end 121 of the stylus pen 120 presses the button key 130b. The button key 130b is pressed and the locking state of the touch screen is set to the ON state in response to an electrical signal from the PCB 131b according to the press. When the stylus pen 120 continuously presses the button key 130b, the locking state of the touch screen is maintained in an ON state. In this case, since the touch screen is locked even when the touch screen is in contact with the outside, a function or operation is prevented when the touch screen is touched. When the stylus pen 120 is detached from the mounting groove 111, the button key 130b pressed by the stylus pen 120 is released and the touch screen locking mechanism in placed in an OFF state. Since the locking state of the touch screen is switched from the ON state to the OFF state, a character, call, or menu can be executed when the stylus pen makes contact with the touch screen. Accordingly, information can be input when the stylus pen 120 makes contact with the touch screen.

The operation of the portable communication device having the touch key 130c of the touch form as the touch-screen locking unit will be described with reference to FIGS. 9 and 10. The touch key 130c is provided at an end of the mounting groove 111 to make contact with the one end 121 of the stylus pen 120. The first bracket 141 for supporting the touch key 130c is provided at the end of the mounting groove 111. The second bracket 142, for supporting the stylus pen 120 and preventing the movement of the stylus pen 120, is provided on an inner periphery of the mounting groove 111. When the stylus pen 120 is attached to the mounting groove 111, the stylus pen 120 is supported by engagement with the second bracket 142 and the one end 121 of the stylus pen 120 is in contact with the touch key 130c. When the stylus pen 120 is in contact with the touch key 130c, the locking state of the touch screen can be set to the ON state and stably maintained, thereby preventing information such as a menu, etc. from being executed even when the touch screen makes contact with the outside. However, when the stylus pen 120 is detached from the mounting groove 111, the contact state between the stylus pen 120 and the touch key 130c is released and the locking state of the touch screen is changed to the OFF state. When the stylus pen 120 makes contact with the touch screen various menus can be executed or information can be input.

The operation of the portable communication device having the first and second magnetic members 131d and 132d with the magnetism as the touch-screen locking unit will be described with reference to FIG. 11. The first magnetic member 131d with the magnetism is provided on an inner side of the stylus pen 120 and the second magnetic member 132d for detecting the magnetism of the first magnetic member 131d is provided at a predetermined position of the mounting groove 111. Here, the first magnetic member 131d and the second magnetic member 132d are provided to have different polarities from each other or the same polarity as each other so that the ON/OFF state of the touch screen can be switched. Alternatively, the ON/OFF state of the touch screen can be switched by a magnetic field like the magnet. When the stylus pen 120 is attached to the mounting groove 111, the first magnetic member 131d formed on the stylus pen 120 makes contact with the second magnetic member 132d provided on the mounting groove 111. Accordingly, when the first magnetic member 131d reacts to the second magnetic member 132d, the locking state of the touch screen becomes the ON state and can be stably maintained even when the touch screen makes contact with the outside. When the stylus pen 120 is detached from the mounting groove 111, the contact state between the first magnetic member 131d formed at the end of the stylus pen 120 and the second magnetic member 132d formed at the end of the mounting groove 111 is released and the locking state of the touch screen is changed to the OFF state. Thus, when the stylus pen 120 makes contact with the touch screen various menus can be executed or information can be input.

The operation of the portable communication device having the sensor 130e for sensing the attachment/detachment of the stylus pen 120 to/from the inner periphery of the mounting groove 111 as the touch-screen locking unit will be described with reference to FIGS. 12 and 13. The sensor 130e formed on the inner periphery of the mounting groove 111 senses the attachment/detachment of the stylus pen 120. When the stylus pen 120 is attached to the mounting groove 111, the sensor 130e senses the attachment of the stylus pen 120. A signal sensed by the sensor 130e is applied to the controller 131e and the locking state of the touch screen is set to the ON state in response to the signal applied to the controller 131e. Accordingly, the locking state of the touch screen is constantly maintained in an ON state by maintaining a state in which the stylus pen 120 is attached to the inner side of the mounting groove 111. Since the touch screen is locked even when the touch screen makes contact with the outside, a touch screen function or operation can be prevented and the locking state can be stably maintained. However, when the stylus pen 120 is detached from the mounting groove 111, the sensor 130e senses the detachment of the stylus pen 120. A signal sensed by the sensor 130e is applied to the controller 131e and the locking state of the touch screen is set to the OFF state in response to the signal applied to the controller 131e. When the stylus pen 120 makes contact with the touch screen by setting the locking state of the touch screen to the OFF state, various menus can be executed or information can be input.

The touch-screen locking unit provided on the mounting groove to/from which the stylus pen is attached/detached can be switched by the attachment/detachment of the stylus pen, thereby preventing a setting change of the touch-screen locking unit according to an external environment and a touch screen malfunction. The locking state of the touch screen can be automatically switched by the attachment/detachment of the stylus pen, so that the user can conveniently use the portable communication device having the touch screen. The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention.

An example in which the touch-screen locking unit includes the dome key 130a, the button key 130b, the touch key 130c, the first and second magnetic members 131d and 132d, or the sensor 130e has been illustrated. A device capable of setting the touch screen to the ON/OFF state through the attachment/detachment of the stylus pen can be provided. Although not illustrated, a protrusion formed at a predetermined position on the outer periphery of the stylus pen may be provided, and a slide type button sliding and moving at a position engaged with the protrusion on the inner periphery of the mounting groove may be provided. When the stylus pen is attached to or detached from the mounting groove, the locking state of the touch screen can be switched to the ON or OFF state by sliding and moving the slide type button in an attachment or detachment direction.

In a portable communication device having a touch-screen locking unit according to the above-described exemplary embodiment of the present invention, a locking state of a touch screen can be automatically set to an ON/OFF state by attaching/detaching a stylus pen to/from a mounting groove of a main body housing. A locking unit is conventionally provided on an outer side. However, the locking unit is provided on an inner side of the main body housing according to the exemplary embodiment of the present invention. When the touch screen is carried or kept, the locking state of the touch screen is set through the attachment/detachment of the stylus pen, thereby preventing a touch screen malfunction or change according to an external environment, increasing the stability of the touch-screen locking unit, and improving the reliability of the touch screen for the user. A special touch-screen locking unit does not need to be installed on an outer side of the main body housing by providing the touch-screen locking unit on the mounting groove of the main body housing. The aesthetics of the main body housing can be improved by providing the touch-screen locking unit on the inner side of the main body housing.

While the invention has been shown and described with reference to a certain exemplary embodiments thereof, it will be understood by those skilled in the art that various changes in form and details may be made therein without departing from the spirit and scope of the invention as defined by the appended claims and their equivalents.

What is claimed is:

1. A portable communication device having a touch-screen locking unit, comprising:
   a main body housing having a touch screen;
   a mount formed in the main body housing to/from which an input unit is removably attached;
   a locking unit provided on the mount and turning on/off a locking state of the touch screen according to attachment/detachment of the input unit within the main body housing, and
   a slide button arranged on an outer periphery of the input unit which slides and moves at a position engaged with a protrusion on an inner periphery of the mounting groove to turn on/off the locking state of the touch screen according to being slid in a respective predetermined direction.

2. The portable communication device of claim 1, wherein the mount is made of a mounting groove and the input unit is made of a stylus pen.

3. The portable communication device of claim 2, wherein the locking unit is made of a dome key.

4. The portable communication device of claim 3, wherein a support member for supporting the dome key and preventing movement of the stylus pen is provided on the mounting groove.

5. The portable communication device of claim 4, wherein the support member includes:
   a first bracket provided at a lower end of the dome key and supporting the dome key; and
   a second bracket provided on the mounting groove, surrounding the stylus pen, and preventing the movement of the stylus pen.

6. The portable communication device of claim 5, wherein the locking state of the touch screen is set to an ON state by pressing the dome key when the stylus pen is attached to the mounting groove, and the locking state of the touch screen is set to an OFF state by releasing the pressed dome key when the stylus pen is detached from the mounting groove.

7. The portable communication device of claim 2, wherein the locking unit is made of a button key and a printed circuit board (PCB) electrically connected to the button key and a main PCB of the touch screen is provided at a lower end of the button key.

8. The portable communication device of claim 7, wherein a support member for supporting the button key and preventing movement of the stylus pen is provided on the mounting groove.

9. The portable communication device of claim 8, wherein the locking state of the touch screen is set to an ON state by pressing the button key when the stylus pen is attached to the mounting groove, and the locking state of the touch screen is set to an OFF state by releasing the pressed button key when the stylus pen is detached from the mounting groove.

10. The portable communication device of claim 2, wherein the locking unit is made of a touch key and the locking state of the touch screen is set to an ON or OFF state when the stylus pen is in contact or non-contact with the touch key.

11. The portable communication device of claim 10, wherein a support member for supporting the touch key and preventing movement of the stylus pen is provided on the mounting groove.

12. The portable communication device of claim 11, wherein the support member includes:
   a first bracket provided at a lower end of the touch key and supporting the touch key; and
   a second bracket provided on the mounting groove, surrounding the stylus pen, and preventing the movement of the stylus pen.

13. The portable communication device of claim 12, wherein the locking state of the touch screen is set to an ON state by making contact with the touch key when the stylus pen is attached to the mounting groove, and the locking state of the touch screen is set to an OFF state by releasing the touch key making contact with the stylus pen.

14. The portable communication device of claim 2, wherein the locking unit includes:
   a first magnetic member provided at one end of the stylus pen; and
   a second magnetic member provided at an end of the mounting groove and engaging with the first magnetic member or making contact therewith,
   wherein the locking state of the touch screen is set to an ON or OFF state when the first magnetic member is in contact or non-contact, respectively, with the second magnetic member.

15. The portable communication device of claim 14, wherein the locking state of the touch screen is set to an ON state when the first magnetic member provided at the end of the stylus pen is in contact with the second magnetic member provided on the mounting groove, and the locking state of the touch screen is set to an OFF state and the first magnetic member is in non-contact with the second magnetic member when the stylus pen is detached from the mounting groove.

16. The portable communication device of claim 2, wherein the locking unit comprises:
   a sensor provided on the mounting groove and
   a controller for controlling a signal sensed by the sensor when the stylus pen is attached/detached.

17. The portable communication device of claim 16, wherein the locking state of the touch screen is set to an ON state when the sensor senses the detachment of the stylus pen.

18. A touch screen locking mechanism within a portable communication device comprising:
   a mounting groove contained within said device, said mounting groove including an open end and a closed end, said closed end including a means for contacting a PCB, said PCB generating a signal for locking a touch screen when said means contacts said PCB; a latching mechanism attached to an inner periphery of said mounting groove, and said means for contacting the PCB includes a slide button arranged on an outer periphery of an input unit which slides and moves at a position engaged with a protrusion on the inner periphery of the mounting groove to turn on/off the locking state of the touch screen according to being slid in a respective predetermined direction.

19. The touch screen locking mechanism of claim 18, wherein said means for contacting said PCB consists of at least one element selected from the group consisting of: a dome key, a button key, a touch key, a magnetic element and a sensor/controller element.

* * * * *